(12) United States Patent
Gupta et al.

(10) Patent No.: US 9,348,682 B2
(45) Date of Patent: May 24, 2016

(54) METHODS FOR TRANSITIONING CONTROL BETWEEN TWO CONTROLLERS OF A STORAGE SYSTEM

(71) Applicant: Nimble Storage, Inc., San Jose, CA (US)

(72) Inventors: Vikas Gupta, Santa Clara, CA (US); Ashutosh Tripathi, Union City, CA (US); Bob Fozard, Los Gatos, CA (US); Tomasz Barszczak, Palo Alto, CA (US)

(73) Assignee: Nimble Storage, Inc., San Jose, CA (US)

( * ) Notice: Subject to any disclaimer, the term of this patent is extended or adjusted under 35 U.S.C. 154(b) by 0 days.

(21) Appl. No.: 14/470,885

(22) Filed: Aug. 27, 2014

(65) Prior Publication Data

US 2015/0067414 A1 Mar. 5, 2015

Related U.S. Application Data

(63) Continuation of application No. 14/015,910, filed on Aug. 30, 2013.

(51) Int. Cl.
*G06F 3/00* (2006.01)
*G06F 11/07* (2006.01)
*G06F 11/20* (2006.01)

(52) U.S. Cl.
CPC ........ *G06F 11/0757* (2013.01); *G06F 11/0727* (2013.01); *G06F 11/2092* (2013.01); *G06F 2201/81* (2013.01)

(58) Field of Classification Search
None
See application file for complete search history.

(56) References Cited

U.S. PATENT DOCUMENTS

| | | | |
|---|---|---|---|
| 5,274,645 A | 12/1993 | Idleman et al. | |
| 5,619,642 A | 4/1997 | Nielson et al. | |
| 5,928,367 A | 7/1999 | Nelson et al. | |
| 6,578,158 B1 | 6/2003 | Deitz et al. | |
| 6,920,579 B1 * | 7/2005 | Cramer et al. | 714/4.2 |
| 6,920,580 B1 * | 7/2005 | Cramer et al. | 714/4.11 |
| 7,047,439 B2 | 5/2006 | Shah | |
| 7,487,531 B1 | 2/2009 | Vogel et al. | |
| 7,730,274 B1 | 6/2010 | Usgaonkar | |
| 8,352,661 B1 | 1/2013 | Sanville et al. | |
| 8,589,626 B2 | 11/2013 | Cho | |

(Continued)

OTHER PUBLICATIONS

Office Action dated Mar. 4, 2015, from U.S. Appl. No. 14/015,910, filed Aug. 30, 2013, 16 pgs.

(Continued)

*Primary Examiner* — Henry Tsai
*Assistant Examiner* — Dean Phan
(74) *Attorney, Agent, or Firm* — Ascenda Law Group, PC (57) ABSTRACT

Described herein are techniques for transitioning control between a first and second controller of a storage system. In such transition, the first controller transmits a message to a memory element shared by the first and second controllers, the message capable of notifying the second controller of an imminent failure of the first controller. The second controller receives the message from the shared memory element, the message notifying the second controller of an imminent failure of the first controller. Subsequent to transmitting the message to the shared memory element, the first controller becomes unavailable to facilitate access to the storage devices of the storage system. Subsequent to receiving the message from the shared memory element, the second controller becomes available to facilitate access to the storage devices of the storage system.

20 Claims, 10 Drawing Sheets

(56) References Cited

U.S. PATENT DOCUMENTS

| | | | |
|---|---|---|---|
| 2003/0204683 | A1 | 10/2003 | Okumoto et al. |
| 2005/0228947 | A1 | 10/2005 | Morita et al. |
| 2006/0220652 | A1* | 10/2006 | Keppeler ................ 324/426 |
| 2007/0210650 | A1* | 9/2007 | Togashi ................... 307/43 |
| 2008/0120483 | A1 | 5/2008 | Kobayashi et al. |
| 2008/0162984 | A1 | 7/2008 | Kalra et al. |
| 2008/0244302 | A1 | 10/2008 | Khatri et al. |
| 2010/0211544 | A1* | 8/2010 | Chen et al. ............... 707/622 |
| 2011/0252270 | A1 | 10/2011 | Abraham et al. |
| 2012/0297135 | A1 | 11/2012 | Mathew et al. |
| 2013/0185508 | A1 | 7/2013 | Talagala et al. |

OTHER PUBLICATIONS

"The International Search Report and the Written Opinion", from the International Searching Authority mailed Nov. 25, 2014, PCT/US14/48922 (filed Jul. 30, 2014), 11 pgs.

Amendment and Response to Office Action filed Jun. 4, 2015, from U.S. Appl. No. 14/015,910, filed Aug. 30, 2013, 8 pgs.

Final Office Action dated Sep. 22, 2015. from U.S. Appl. No. 14/015,910, filed Aug. 30, 2013, 11 pgs.

Amendment and Response to Office Action filed Dec. 10, 2015, from U.S. Appl. No. 14/015,910, filed Aug. 30, 2013, 8 pgs.

* cited by examiner

METHODS FOR TRANSITIONING CONTROL BETWEEN TWO CONTROLLERS OF A STORAGE SYSTEM

RELATED APPLICATIONS

This application is a Continuation of U.S. application Ser. No. 14/015,910 filed on Aug. 30, 2013, incorporated herein by reference.

FIELD OF THE INVENTION

The present invention relates to techniques for transitioning control between two controllers of a storage system, and more particularly relates to transitioning control in response to the imminent failure of one of the controllers.

BACKGROUND

Storage arrays, i.e., storage systems having a plurality of storage devices (e.g., solid state drives (SSDs), magnetic disks, and/or optical drives) are becoming more widely used. Storage arrays provide the benefits of better data reliability (e.g., one storage device may fail, and data can still be retrieved from the remaining storage devices) and read/write throughput (e.g., multiple storage devices can service read/write requests in parallel), as compared to a storage system with only a single storage device.

With such benefits, storage arrays also come with some overhead. As part of the overhead is the need for a controller to facilitate access to the plurality of storage devices (e.g., determine which one or more of the storage devices should a data block be written to, determine which one or more of the storage devices should a read request be sent to for processing, etc.) A storage system, of course, is as robust as it weakest link. If its controller fails, the added redundancy provided by the multiple storage devices is of little use. Therefore, it is not uncommon for a storage system to include multiple controllers. Typically only one of the controllers is active (e.g., is responsible for facilitating access to the plurality of storage devices) at any time. A controller that is active may be called an active controller, whereas a controller that is currently inactive, but may become active upon failure of the active controller may be called a standby controller. A controller that has experienced a failure and is temporarily unable to either service any requests or even become active (e.g., is restarting as part of a software update) may be called a failed controller.

There are currently two main approaches for controlling which controller should be the active controller and which one should be the standby controller. A first approach employs a direct link between two controllers to transmit "heartbeats" from the active controller to the standby controller. Heartbeats may refer to periodically transmitted pulses, not unlike the human heartbeat. The standby controller expects to receive a heartbeat from the active controller once every time period H. Typical values of H are in the range of 1-2 seconds. Upon not detecting one or more successive heartbeats (typically 5 to 10 heartbeats) within an expected timeframe (e.g., 5 to 20 seconds), the standby controller assumes the active controller has failed, and the standby controller becomes the active controller (e.g., starts servicing any requests to the storage system).

Such approach, however, has some drawbacks. As one drawback, there is a lag between the time the active controller fails (and stops servicing requests) and the time the standby controller detects the failure of the active controller (and starts servicing requests). During this time lag (which may be equal or greater than time H), the storage system is unable to service any requests.

In a second approach, an auxiliary device is used to monitor the operational state of the two controllers. Upon the auxiliary device detecting the failure of the active controller (e.g., a heartbeat signal of the active controller could be transmitted to the auxiliary device, and failure of the active controller could be indicated by the lack of heartbeats), the auxiliary device instructs the standby controller to become the active controller (i.e., activates the standby controller). The second approach has drawbacks similar to the first approach, as there is likewise a lag between the time that the active controller fails and the time the auxiliary device activates the standby controller. During this time lag, the system is unable to service any requests.

SUMMARY OF THE INVENTION

In one embodiment of the invention, methods are provided to decrease the time that a storage system is unable to service requests due to failure of one (or more) of the controllers. Techniques of the present invention will be described in the context of two controllers for ease of description, although such techniques can be extended to storage systems with two or more controllers. In contrast to the approaches employed in existing systems that are reactive to the failure of a controller (i.e., which detect failure events), various embodiments of the present invention rely upon the notification of an imminent failure of a controller. In one embodiment, an active controller, anticipating that it will experience an imminent failure, notifies a standby controller of its imminent failure.

In one embodiment of the invention, an active controller notifies a standby controller of its imminent failure by transmitting a message to a memory element shared between the active controller and the standby controller. An analogy for such message is a "suicide note", as it is written prior to the failure (or "death") of the controller and indicates the imminent failure (or "imminent death") of the controller. At times, for ease of description, such message may be referred to as a suicide note. Upon "reading the suicide note", the standby controller receives an advanced warning of the failure of the active controller and therefore allows the standby controller to become the active controller soon after the active controller fails.

In another embodiment of the invention, prior to transmitting the suicide note, the active controller starts a timer that expires after a time period T. Typical values of T are in the range of 1 to 2 seconds. Such timer may be a "hardware watchdog" or a "watchdog timer". In most instances, it is expected that the active controller will fail before the timer expires. If, however, the active controller is still active at the time the timer expires, the active controller is automatically transitioned to an inactive state (i.e., either transitions to a standby state or a failure state) and automatically stops facilitating access to the storage devices of the storage system. Therefore, the timer provides an assurance that the active controller will be rendered inactive after time period T, and safeguards against the possibility of both controllers being active (i.e., an undesirable state known as "split brain"). An analogy for the timer is a "contract killer", where money is paid to an assassin to kill an individual. Continuing with the above analogy of suicide notes, the "contract killer" makes sure the active controller is rendered inactive in the event that the first controller "fails to commit suicide".

In embodiments where the active controller employs a timer that expires after a time period T, the standby controller may also take measures to prevent both controllers from being active. Taking a step back, upon the standby controller receiving a suicide note of the active controller, the standby controller could immediately become active. However, the active controller could still be active, resulting in both controllers being active. To avoid this scenario, the standby controller, upon receiving the suicide note of the active controller, waits for a time period equal to (or greater than) T before becoming active. By waiting for a time period equal to (or greater than) T, the standby controller can be assured that the (formerly) active controller is no longer active before the standby controller becomes active.

In another embodiment of the invention, the above-described techniques are applied to the scenario in which software updates are performed on the two controllers. Software updates on a controller typically include two stages. In a first stage, software is installed on a controller, during which an active controller can still service requests or a standby controller can still become the active controller. In a second stage, the controller is restarted (or rebooted) to complete the software installation. During this time, the controller is unable to service requests (i.e., is in a failure state). Software updates on a standby controller cause little or no issues, as long as the software updates conclude before the standby controller needs to become active. Software updates on an active controller are more problematic, as the active controller is unable to service requests while it is being rebooted. To minimize the disruption in service, the standby controller needs to become active soon after the active controller begins to reboot.

In light of the above considerations, software updates may be applied to two controllers in the following sequence of steps, in accordance with one embodiment of the invention. First, the standby controller may update its software (i.e., install software and reboot). Such installation causes no interruption to the storage system's ability to service requests, as any requests are handled by the other controller (i.e., currently the active controller). After the standby controller has completed updating its software, the active controller may start to update its software. Nearing the completion of the software installation but prior to the active controller being rebooted, the active controller may set the above-described timer (i.e., contract killer) to expire in a period T. For instance, the active controller may estimate a reboot to occur in 1 second, and set the timer to expire in 2 seconds. After the active controller sets the timer, the active controller leaves a suicide note at a shared memory element (i.e., memory element shared between the two controllers). Before or at the expiration of the timer, the active controller is restarted and enters a failure state (i.e., is unable to either service requests or become active). Upon the standby controller retrieving the suicide note from the shared memory element, the standby controller may wait for a period T (to make sure the active controller is inactive) before becoming the active controller.

These and other embodiments of the invention are more fully described in association with the drawings below.

BRIEF DESCRIPTION OF THE DRAWINGS

The present invention is illustrated by way of example, and not limitation, in the figures of the accompanying drawings in which.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Description associated with any one of the figures may be applied to a different figure containing like or similar components/steps.

Figure 1:
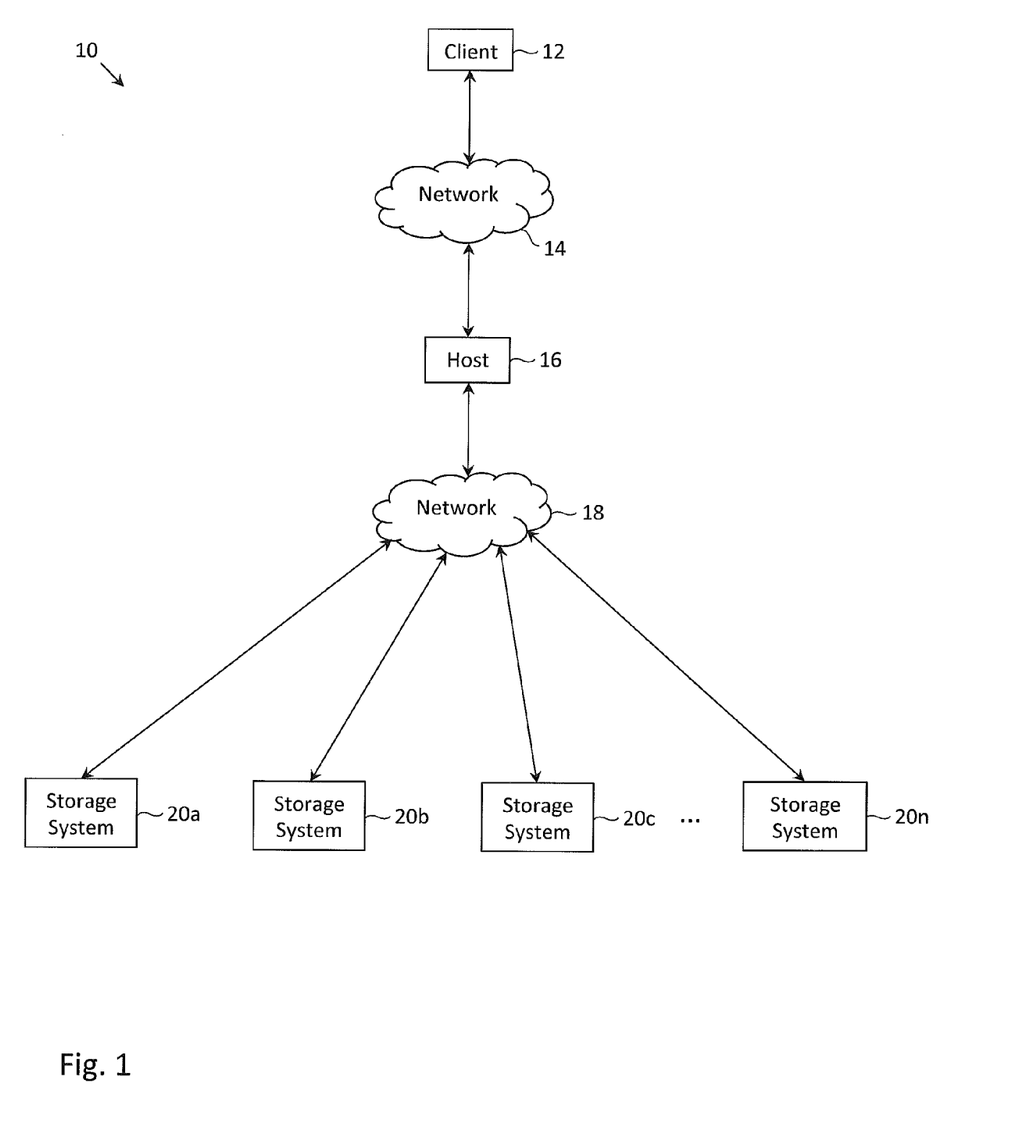
FIG. 1 depicts a diagram of a network environment.

FIG. 1 depicts a diagram of network environment 10 in which client 12 may be communicatively coupled to host 16 via network 14. Network 14 may be any form of communications means and, in some cases, may be individual communications links, or one or more communications networks, including private networks, public networks and/or virtual private networks over public networks. For ease of description and illustration, only one client and one host have been depicted, while it is understood that numerous clients in numerous hosts may be present in network environment 10. Host 16 may be communicatively coupled to a plurality of storage systems (20a, . . . 20n) via network 18. Network 18 likewise may be any form of communications means and, in some cases, may be individual communications links, or one or more communications networks, including private networks, public networks and/or virtual private networks over public networks. While a plurality of storage systems have been depicted, it is possible that only a single storage system is present.

In one sequence of steps that might occur in association with the components depicted in FIG. 1, client 12 may transmit a request for data to host 16 (e.g., may request a webpage associated with a URL). In turn, host 16 may transmit a request for data to one or more of storage systems (20a, . . . 20n). For instance, an image might be requested from storage system 20a, an advertisement might be requested from storage system 20b, etc. It is possible that host 16 sends a data request to another host (not depicted), which in turn sends a data request to storage system 20c. One or more of storage systems (20a, . . . 20n) may transmit the requested data to host 16, which in turn may transmit the requested data to client 12. In the case of client 12 requesting a webpage, various components of a webpage (e.g., text, images, etc.) may be assembled by a browser of client 12 into a webpage that can be viewed by a user of client 12.

Figure 2:
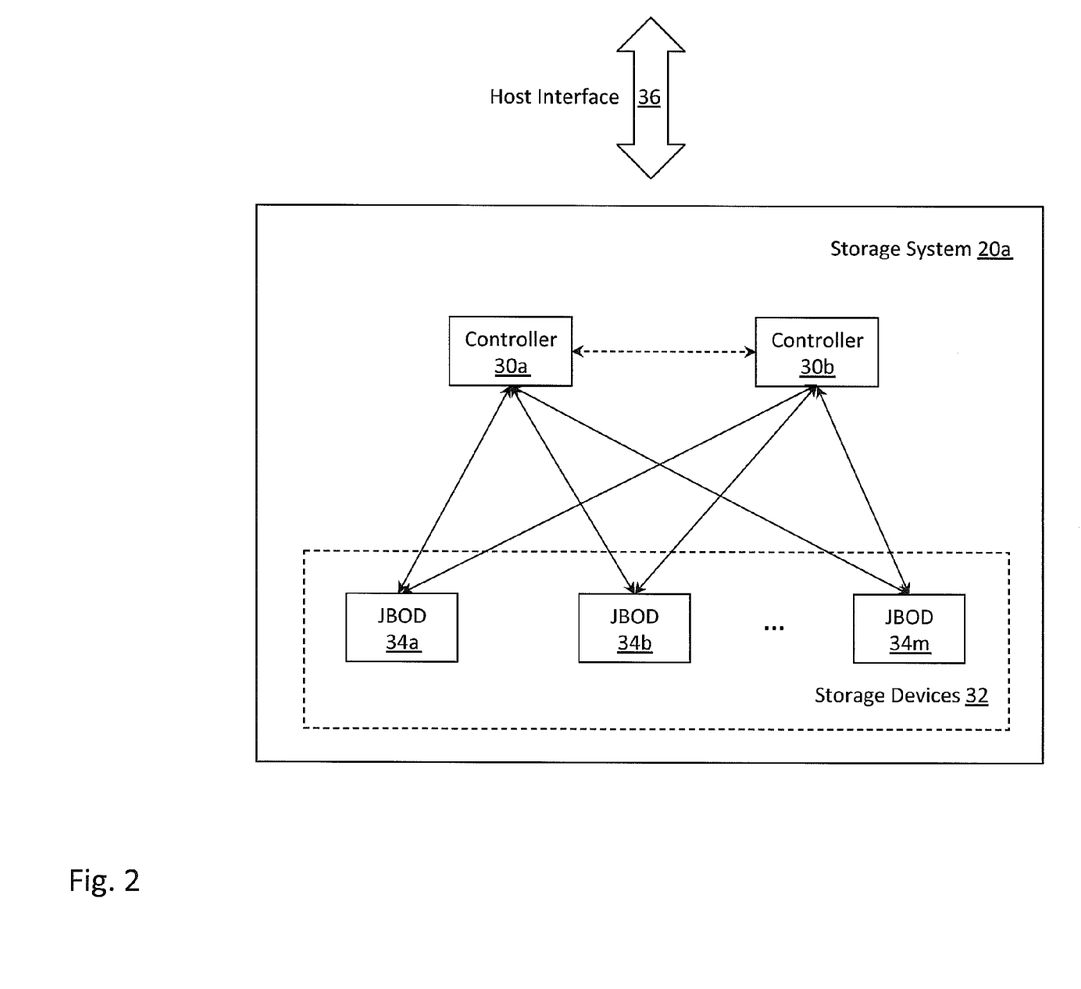
FIG. 2 depicts a storage system, within which techniques of the present invention may be applied.

FIG. 2 depicts one of the storage systems, in accordance with an embodiment of the invention. While storage system 20a has been depicted, the depiction may be representative of any of storage systems (20a, . . . 20n). Storage system 20a may include controllers 30a and 30b, and storage devices 32. The controllers may facilitate access (e.g., the host's access) to storage devices 32. In the embodiment depicted in FIG. 2, storage devices 32 include an array of JBODs (34*a*, ... 34*m*), JBOD being an acronym for "Just a Bunch Of Disks" or "Just a Bunch Of Drives". More generally, storage devices 32 may include an array of magnetic disks, an array of solid-state drives (SSDs), an array of optical drives, etc. Storage devices 32 may also include a plurality of hybrid storage units that include both hard disks and flash drives. As shown in FIG. 2, each controller may be communicatively coupled to each JBOD. Controller 30*a* may also be communicatively coupled to controller 30*b*, and such link may be used to transmit the above-described heartbeat signal. Storage system 20*a* may receive requests from host 16 and service such requests via host interface 36.

Figure 3:
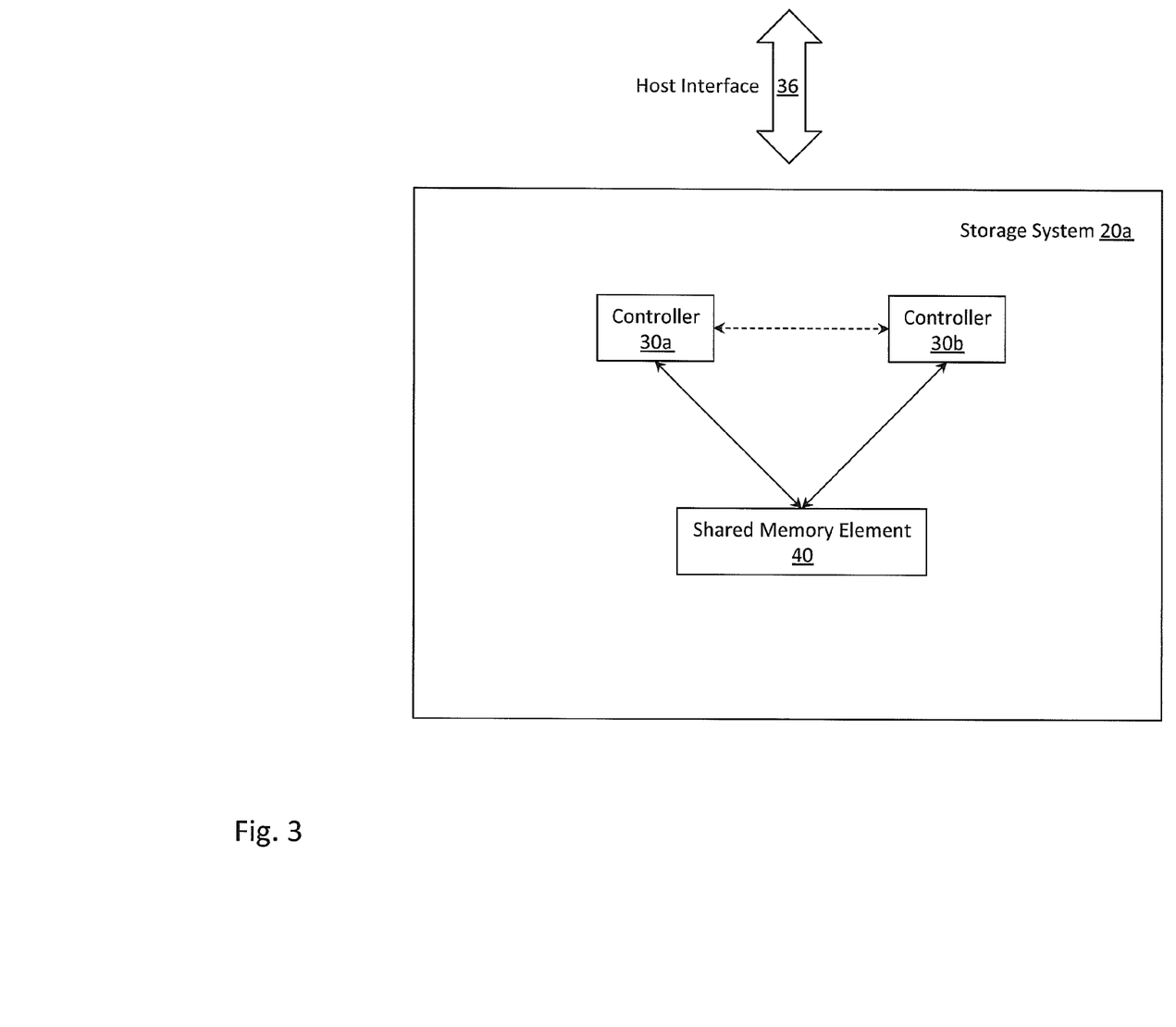
FIG. 3 depicts a storage system (with only a partial representation of its components), within which techniques of the present invention may be applied.

FIG. 3 depicts a partial representation (i.e., including only a limited number of components) of storage system 20*a*, in accordance with one embodiment of the invention. As depicted in FIG. 3, controller 30*a* and controller 30*b* are each communicatively coupled to memory element 40, labeled as a "shared memory element". Shared memory element 40 may be part of storage devices 32 (as depicted in FIG. 2), and even may be located on one or more of JBODs (34*a*, ... 34*m*). Alternatively, shared memory element 40 may be located on a device separate from storage devices 32. Controllers 30*a* and 30*b* may communicate with one another by way of shared memory element 40. For instance, controller 30*a* may leave a message for controller 30*b* on shared memory element 40, and controller 30*b* may retrieve said message from shared memory element 40.

Figure 4:
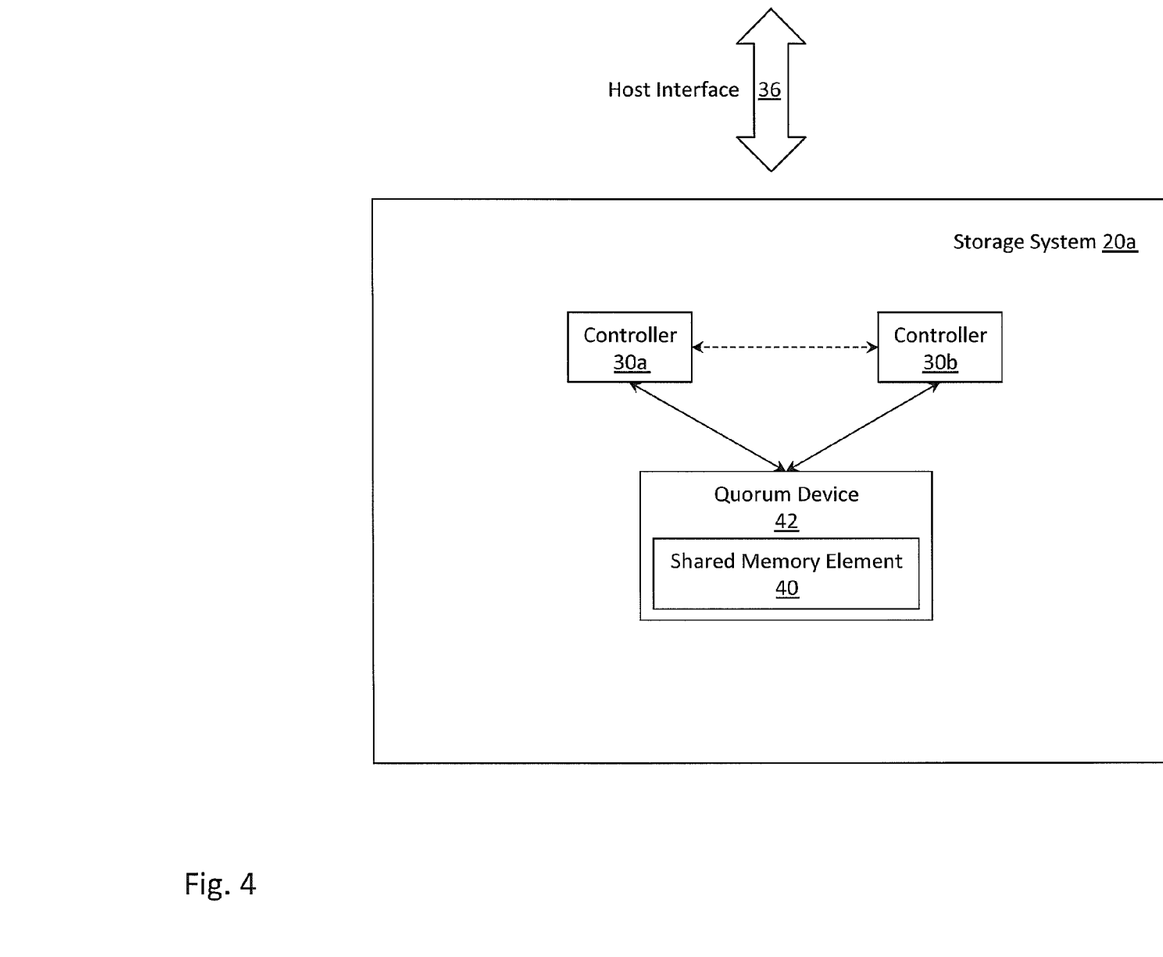
FIG. 4 depicts a storage system (with only a partial representation of its components), within which techniques of the present invention may be applied.

FIG. 4 depicts a particular embodiment of the storage system of FIG. 3, in which shared memory element 40 is located on quorum device 42. Quorum device 42 may in turn be located within storage devices 32 (as depicted in FIG. 2), and may even be located on one or more of JBODs (34*a*, ... 34*m*). In a preferred embodiment, storage devices 32 collectively are quorum device 42 (e.g., a quorum is established over a set of disk drives). Alternatively, quorum device 42 may be located on a device separate from storage devices 32. Quorum device 42 includes a processor (or like component that is capable of processing data). Quorum device 42 may, based on certain input, decide which one of controllers 30*a* and 30*b* should be the active controller or the standby controller. The input could include votes from each of JBODs (34*a*,...34*m*) (i.e., votes indicating whether controller 30*a* or controller 30*b* should be active), and the controller receiving the majority of the votes could be selected as the active controller.

Figure 5:
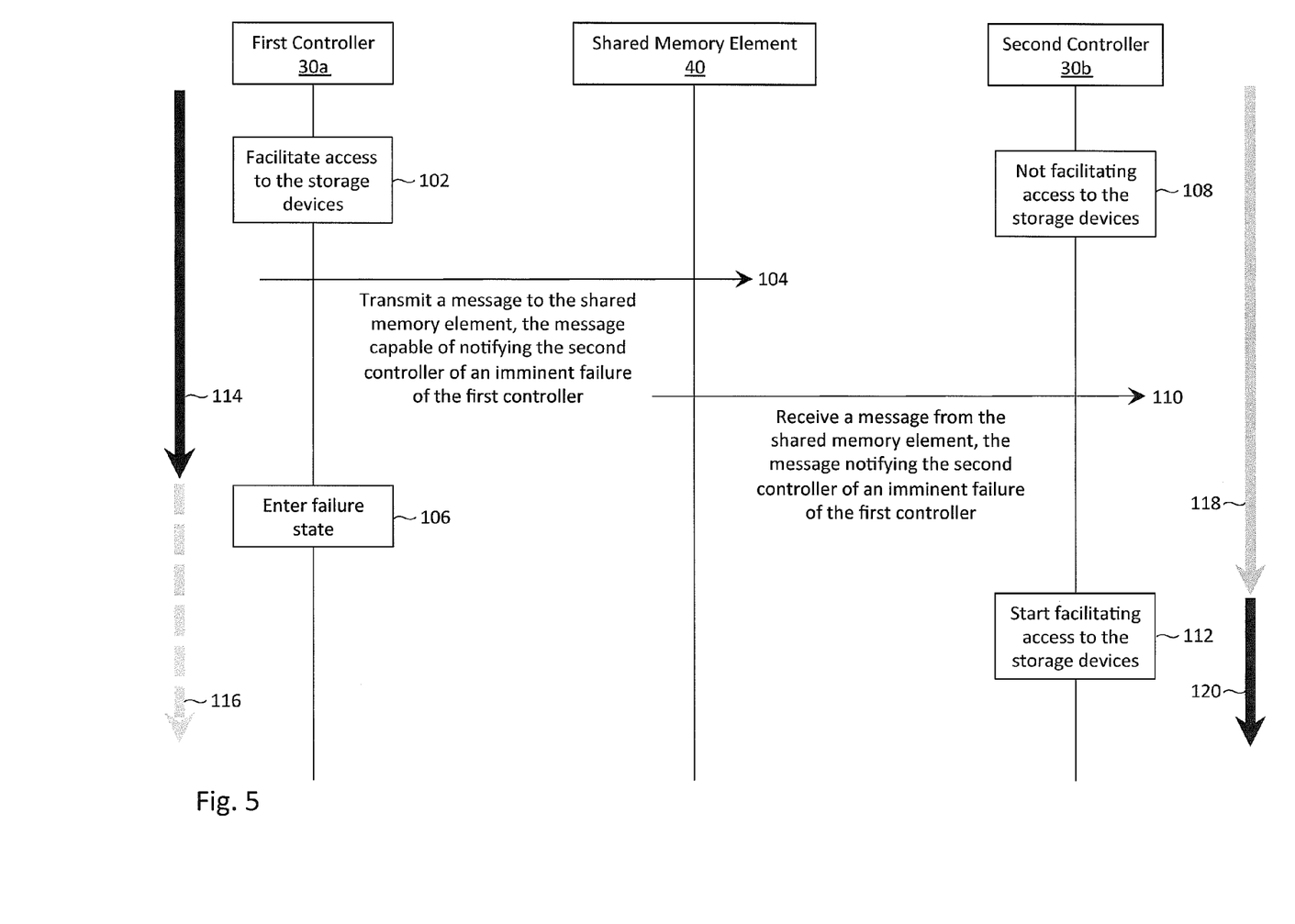
FIGS. 5-7 depict flow diagrams of steps that may be performed by a first and second controller, in accordance with one embodiment of the invention.
Figure 6:
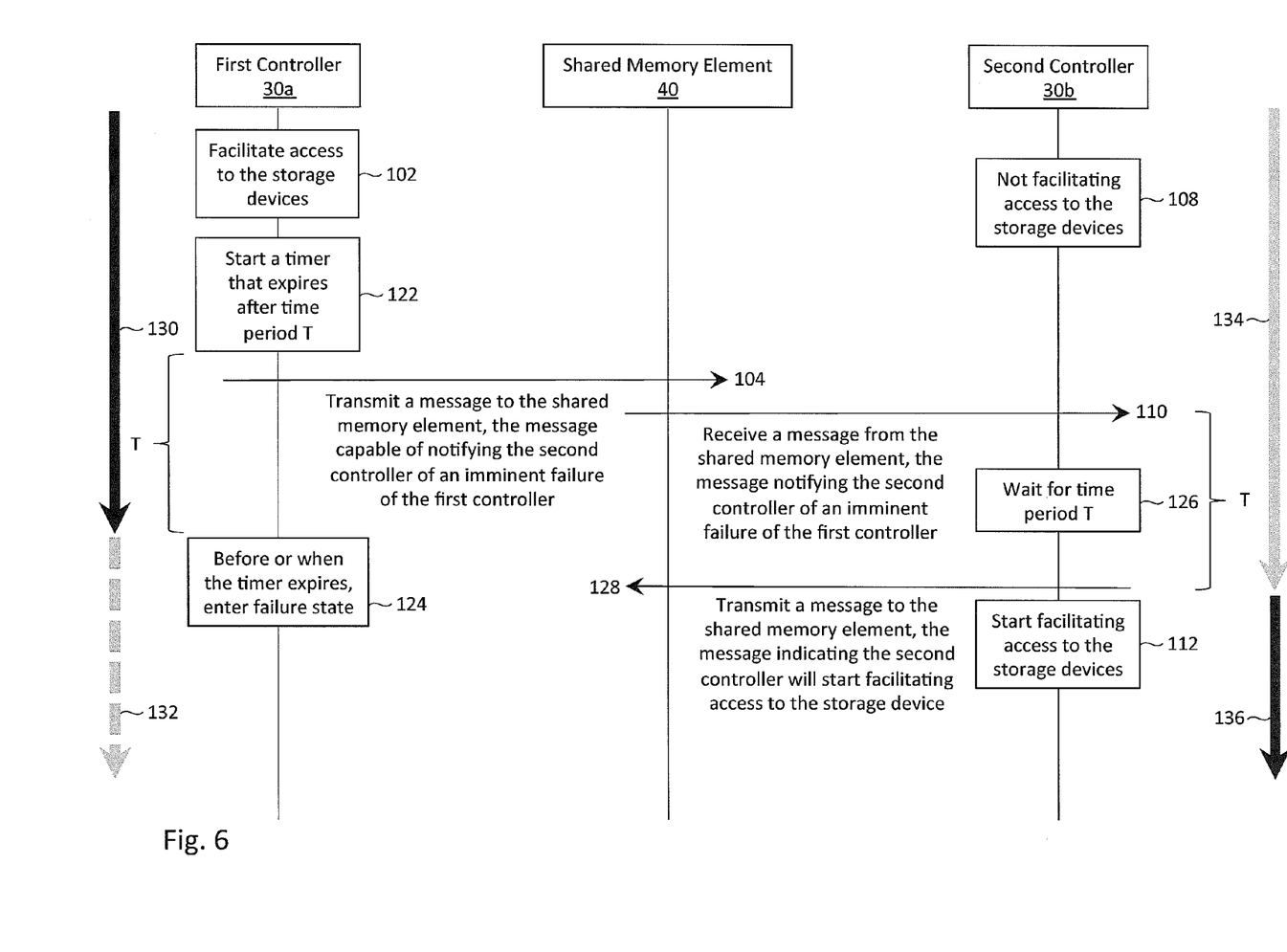
Figure 7:
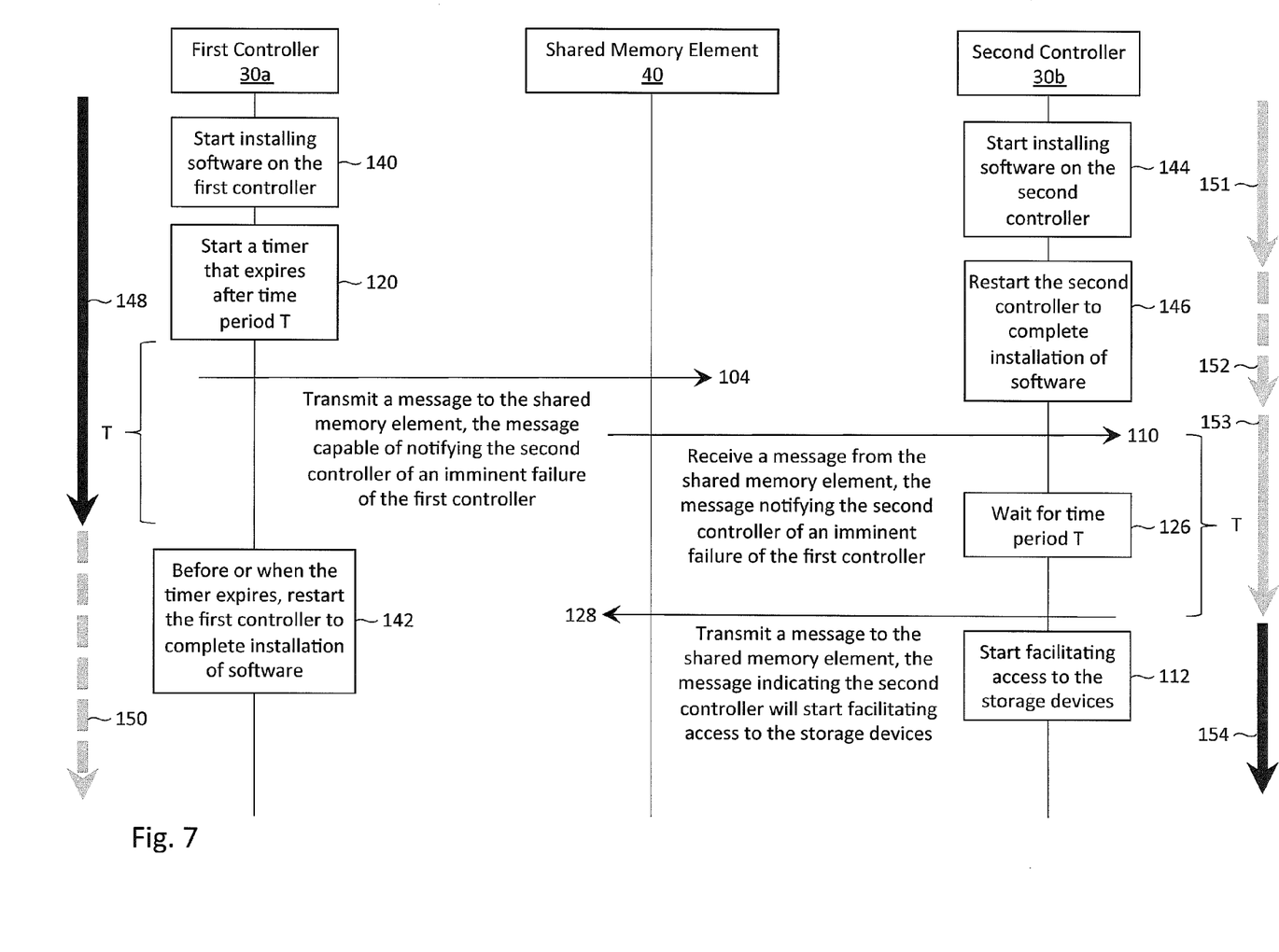

FIGS. 5-7 depict processes to transition the role of the active controller from controller 30*a* to controller 30*b*. While not depicted, similar processes may be employed to transition the role of the active controller from controller 30*b* to controller 30*a*. For ease of description, controller 30*a* will be called the "first controller" and controller 30*b* will be called the "second controller". As depicted in FIG. 5, first controller 30*a* is initially the active controller (i.e., it facilitates access to storage devices 32—step 102), while second controller 30*b* is initially the standby controller (i.e., it does not facilitate access to storage devices 32, but is capable of becoming the active controller—step 108). At step 104, first controller 30*a* may transmit a message to shared memory element 40, the message capable of notifying second controller 30*b* of an imminent failure (or imminent inactivity) of first controller 30*a*. An analogy for such message is a "suicide note", as it is written prior to the failure (or "death") of the first controller and indicates the imminent failure (or "imminent death") of the first controller. After first controller 30*a* transmits the message (i.e., leaves the suicide note), first controller 30*a* (in step 106) may fail, and as such, may temporarily be unable to either facilitate access to storage devices 32 or take the role of an active controller.

At step 110, second controller 30*b* may receive a message from shared memory element 40, the message notifying second controller 30*b* of an imminent failure of first controller 30*a*. Second controller 30*b* may periodically poll shared memory element 40 for any messages from first controller 30*a*. After reception of such message, second controller 30*b* (in step 112) may start facilitating access to storage devices 32 (i.e., may become active). It is preferred that second controller 30*b* becomes active after first controller 30*a* fails, to prevent both controllers from being active at the same time (i.e., known as the "split brain" problem). In split brain, problems may arise when both controllers utilize the same resources (e.g., filesystems, network addresses, etc.). One technique to prevent split brain is for first controller 30*a* to transmit its suicide note immediately before it fails (i.e., step 104 occurs immediately before step 106). In such case, by the time second controller 30*b* receives the suicide note, first controller 30*a* has already failed, and second controller 30*b* may immediately become active without the possibility of both controllers being active at the same time. Such technique also minimizes the time that both controllers are inactive (i.e., minimizes time that the storage system is unable to service requests).

FIG. 5 also includes several downward pointing arrows that indicate the time duration(s) a controller is in an active, a standby or a failure state. A solid black arrow is used to indicate an active state, a solid gray arrow is used to indicate an standby state, and a dashed gray arrow is used to indicate a failure state. If not already apparent, it is noted that time progresses from top to bottom in the flow diagram of FIG. 5. Specifically, solid black arrow 114 followed by dashed gray arrow 116, associated with first controller 30*a*, indicate first controller 30*a* transitioning from an active state during steps 102 and 104 to a failure state during step 106. A similar understanding may be applied to solid gray arrow 118 and solid black arrow 120 associated with second controller 30*b*. Solid gray arrow 118 followed by solid black arrow 120 indicates second controller 30*b* transitioning from a standby state during steps 108 and 110 to an active state during step 112. By viewing dashed gray arrow 116 in connection with solid gray arrow 118, it may be observed that dashed arrow 116 may overlap (in time) with solid gray arrow 118, illustrating that for a short period of time, both the first and second controllers may be inactive. It is desirable that such period of time be made as short as possible, to minimize the time that storage system 20*a* is unable to service any requests. Additional techniques will now be described in association with FIG. 6 to help achieve such goal.

FIG. 6 includes many of the same steps as FIG. 5 with the addition of the use of timers at both the first and second controllers. A timer at (or associated with) first controller 30*a* helps assure that first controller 30*a* is rendered inactive after a time period T. Given the assurance that first controller 30*a* is rendered inactive after time period T, second controller 30*b* accordingly waits for time period T before becoming active. If time period T is made short, the period of time that both controllers are inactive can be made to be short. In practice, time period T may be between 1 to 2 seconds. Accordingly, a system in accordance with embodiment of the present invention may be unable to service requests for approximately 2 to 4 seconds, whereas an existing system relying upon failure detection (i.e., relying on a heartbeat signal) may be unable to service requests for approximately 10 to 20 seconds.

In light of such overview, the steps of FIG. 6 are described in more detail. At step 102, first controller 30a may facilitate access to storage devices 32. At step 122, first controller 30a may start a timer that expires after time period T. Such timer may be a "hardware watchdog" or a "watchdog timer". At step 104, first controller 30a may transmit a message to shared memory element 40, the message capable of notifying second controller 30b of an imminent failure of first controller 30a. After first controller 30a transmits the message (i.e., leaves the suicide note) and before or when the timer expires, first controller 30a (in step 124) may fail, and as such, may temporarily be unable to either facilitate access to storage devices 32 or take the role of an active controller.

In most instances, it is expected that the active controller will fail before the timer expires. If, however, the active controller is still active at the time the timer expires, the active controller is automatically transitioned to an inactive state (i.e., either transitions to a standby state or a failure state). Therefore, the timer provides an assurance that the active controller will be rendered inactive after period T, and safeguards against the possibility of both controllers being active at the same time. An analogy for the timer is a "contract killer", where money is paid to an assassin to kill an individual. Continuing with the above analogy of suicide notes, the "contract killer" makes sure the active controller is rendered inactive in the event that the first controller "fails to commit suicide".

At step 110, second controller 30b may receive a message from shared memory element 40, the message notifying second controller 30b of an imminent failure of first controller 30a. After reception of such message, second controller 30b may wait for a time equal to (or greater than) time period T (step 126), to make sure that first controller 30a has become inactive. Following the waiting, second controller 30b (in step 128) may transmit a message to shared memory element 40, the message indicating the second controller will start facilitating access to storage devices 32. Concurrently or after step 128, second controller 30b may start facilitating access to storage devices 32 (step 112).

In one embodiment, time period T may be a predetermined value that is known ahead of time to both the first and second controllers. In another embodiment, time period T may be a value that is adjustable by first controller 30a. As such, time period T may need to be communicated in the suicide note. For instance, step 104 may include transmitting a message capable of notifying second controller 30b that first controller 30a will fail sometime within the next 2 seconds. In this embodiment, second controller 30b may wait for the time period specified in the suicide note before becoming active.

In another embodiment, the timer associated with first controller 30a may be configured to expire at a certain time instance, rather than after a certain time. In this embodiment, such time instance may be included in the suicide note. For instance, step 104 may include transmitting a message capable of notifying second controller 30b that first controller 30a will fail sometime before 10:51 PM. Second controller 30b may wait until after the specified time instance before becoming active. It is noted that such embodiment assumes that the first and second controllers share a common time reference.

As indicated by solid black arrow 130, first controller 30a starts the timer and transmits the suicide note while in an active state. Subsequent to transmitting the suicide note, first controller 30a enters a failure state, as indicated by dashed gray arrow 132. In FIG. 6, the transition from solid black arrow 130 to dashed gray arrow 132 indicates that first controller 30a fails at the end of time period T. As described above, it is also possible that first controller 30a fails before the end of time period T (while such scenario is not indicated by solid black arrow 130 and dashed gray arrow 132). As indicated by solid gray arrow 134, second controller 30b receives the suicide note and waits for time period T while in a standby state. Subsequent to waiting for time period T, second controller 30b becomes active, as indicated by solid black arrow 136.

FIG. 7 includes many of the same steps as FIG. 6, except that FIG. 7 is adapted for performing software updates on the controllers. Software updates on a controller, particularly an update of system software, typically include two stages. In a first stage, software is installed on a controller, during which the active controller can still service requests or the standby controller can still become the active controller. In a second stage, the controller is restarted (or rebooted) to complete the software installation. During this time, the controller is unable to service requests (i.e., is in a failure state). Software updates on a standby controller causes little or no issues, as long as the software updates conclude before the standby controller needs to become active. Software updates on an active controller are more problematic, as the active controller is unable to service requests while it is being rebooted. To minimize the disruption in service, the standby controller needs to become active soon after the active controller begins to reboot.

In light of such overview, the steps of FIG. 7 are now described in more detail. At step 140, first controller 30a may start installing software, which may be the installation of new software or software updates. During the installation of the software, first controller 30a may start a timer that expires after time period T (step 120). At step 104, first controller 30a may transmit a message to shared memory element 40, the message capable of notifying second controller 30b of an imminent failure of first controller 30a. After first controller 30a transmits the message (i.e., leaves the suicide note) and before or when the timer expires, first controller 30a may be restarted (or rebooted) to complete the software installation (step 142).

At step 144, second controller 30b may start installing software, which may be the installation of new software or software updates. At step 146, second controller 30b may be restarted (or rebooted) to complete the software installation. At step 110, second controller 30b may receive a message from shared memory element 40, the message notifying second controller 30b of an imminent failure of first controller 30a. After reception of such message, second controller 30b may wait for a time equal to (or greater than) time period T (step 126), to make sure that first controller 30a has become inactive. Following the waiting, second controller 30b (in step 128) may transmit a message to shared memory element 40, the message indicating the second controller will start facilitating access to the storage device. Concurrently or after step 128, second controller 30b may start facilitating access to storage devices 32 (step 112).

In a preferred embodiment, the software installation on second controller 30b concludes before (possibly immediately before) software is installed on first controller 30a (i.e., step 146 concludes before step 140). In another embodiment, the software installation on second controller 30b concludes before (possibly immediately before) the timer is started on first controller 30a (i.e., step 146 concludes before step 120). In another embodiment, the software installation on second controller 30b concludes before (possibly immediately before) first controller 30a sends its suicide note (i.e., step 146 concludes before step 104). In another embodiment, the software installation on second controller 30b concludes before (possibly immediately before) first controller 30a reboots (i.e., step 146 concludes before step 142). It is noted that the position of step 146 may need to be shifted relative to steps 140, 120, 104 or 142 in FIG. 7 to better represent one or more of the above scenarios. Further, any other steps depicted in FIGS. 5-9 could be shifted relative to one another as would be apparent to one of ordinary skill in the art.

In any one of the above-described scenarios, second controller 30b might need to inform first controller 30a of the conclusion of its software installation. In one embodiment, second controller 30b transmits a message to shared memory element 40, the message capable of notifying first controller 30a that second controller 30b has completed its software installation (not depicted). First controller 30a may receive said message, the message notifying first controller 30a that second controller 30b has completed its software installation (not depicted). The receipt of such message may trigger any of steps 140, 120, 104 and 142. In another embodiment, second controller 30b might inform first controller 30a of the conclusion of its software installation via the direct link between controllers 30a and 30b, as depicted in FIG. 2.

As indicated by solid black arrow 148, first controller 30a starts its software installation, starts the above-described timer and transmits its suicide note while in an active state. Following the transmission of its suicide note, first controller 30a may enter a failure state, as indicated by dashed gray arrow 150. As indicated by solid gray arrow 151, second controller 30b starts its software installation while in a standby state. Nearing the completion of its software installation, second controller restarts and temporarily enters a failure state, as indicated by dashed gray arrow 152. At the conclusion of its software installation, second controller transitions back into a standby state, as indicated by solid gray arrow 153. While in the standby state, second controller 30b receives the first controller's suicide note, and waits for a time period T. Following its waiting (step 126), second controller 30b may become active, as indicated by solid black arrow 154.

Figure 8:
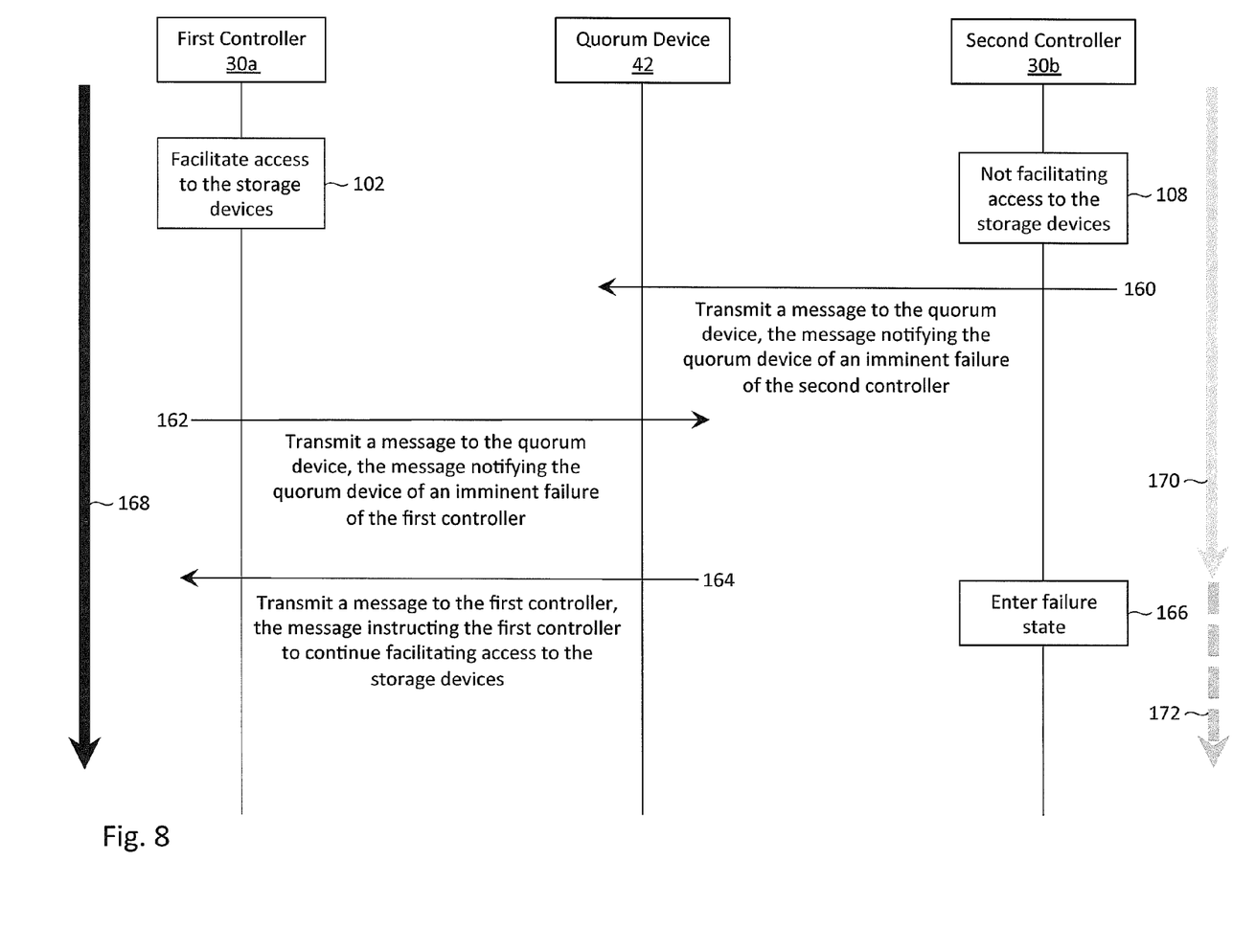
FIGS. 8-9 depict flow diagrams of steps that may be performed by a first controller, a second controller and a quorum device, in accordance with one embodiment of the invention.
Figure 9:
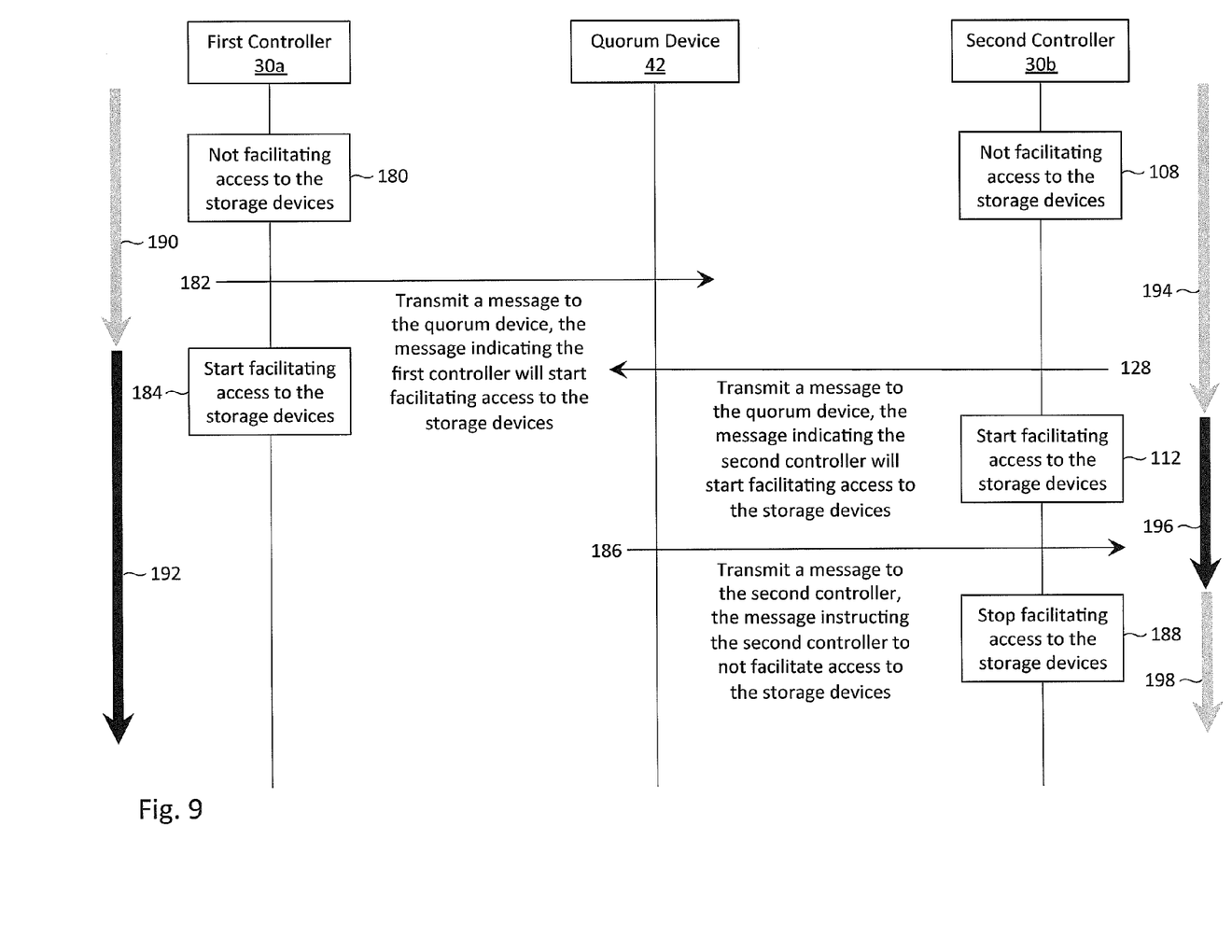

FIGS. 8 and 9 each depict flowcharts that might be performed in an embodiment where shared memory element 40 is present in quorum device 42 (such configuration depicted in FIG. 4). As previously described, quorum device 42 is more than just a memory element, and possesses the capability to process data. FIG. 8 addresses the scenario in which both controllers leave suicide notes and FIG. 9 addresses the scenario in which both controllers transmit activation notes (further described below).

In light of such overview, the flowchart of FIG. 8 is described in more detail (followed by a description of the flowchart of FIG. 9). As indicated by steps 102 and 108, controller 30a is initially in an active state and controller 30b is initially in a standby state, respectively. At step 160, second controller 30b may transmit a message to quorum device 42, the message notifying quorum device 42 of an imminent failure of second controller 30b. It is noted that even a standby controller can transmit a suicide note, in such case indicating that it will become unable to be a standby controller (i.e., unable to take the role of an active controller even if prompted to do so). For instance, second controller 30b may transmit a suicide note before it restarts, as part of a software update. At step 162, first controller 30a may transmit a message to quorum device 42, the message notifying quorum device 42 of an imminent failure of first controller 30a. Upon receiving two suicide notes in close time proximity (and desiring only one of the controllers to remain active), quorum device 42 may transmit a message to first controller 30a, the message instructing first controller 30a to continue facilitating access to storage devices 32 (i.e., "reject" the suicide note of first controller 30a). If not for this action of quorum device 42, both controllers would fail and storage system 20a would (temporarily) be unable to service any requests. While not depicted, quorum device 42 may instead transmit a message to second controller 30b, instructing second controller 30b to remain active. Subsequently, only one of the controllers remains active. In the example depicted in FIG. 8, first controller 30a remains active, whereas second controller 30b fails (step 166). Quorum device 42 may reject the later received suicide note, as depicted in FIG. 8, or it may instead reject the earlier received suicide note (not depicted). Solid black arrow 168 indicates that first controller 30a remains active despite the first controller's desire to enter a failure state. Solid gray arrow 170 followed by dashed gray arrow 172 indicates second controller 30b transitioning from a standby state to a failure state subsequent to it sending a suicide note.

In FIG. 9, controllers 30a and 30b are initially both in a standby state, as indicated by steps 180 and 108. At step 182, first controller 30a may transmit a message to quorum device 42, the message indicating first controller 30a will start facilitating access to storage devices 32 (i.e., become active). For ease of description, such message may be referred to as an "activation note". At step 184, first controller 30a becomes active. At step 128, second controller 30b may transmit a message to quorum device 42, the message indicating second controller 30b will start facilitating access to storage devices 32 (i.e., become active). At step 112, second controller 30a becomes active. Upon receiving two activation notes in close time proximity (and desiring only one of the controllers be active), quorum device 42 may transmit a message to second controller 30b, the message instructing second controller 30b to not facilitate access to storage devices 32 (i.e., "reject" the activation note of second controller 30b). While not depicted, quorum device 42 may instead reject the activation note of first controller 30a. Subsequently, only one of the controllers is active. In the example depicted in FIG. 9, second controller 30b reverts to a standby state (step 188) upon the receipt of the quorum device's rejection of its activation note, whereas first controller 30a remains active. Quorum device 42 may reject the later received activation note, as depicted in FIG. 8, or it may instead reject the earlier received activation note (not depicted). Solid gray arrow 190 and solid black arrow 192 indicate that first controller 30a transitions from a standby state to an active state. Solid gray arrow 194, solid black arrow 196 and solid gray arrow 198 indicate that second controller 30b transitions from a standby state to an active state, before reverting back to a standby state.

In any of the embodiments utilizing suicide notes (e.g., embodiments depicted in FIGS. 5-8), it is noted that if first controller 30a were to fail before it is able to transmit a suicide note (i.e., fail before step 104), second controller 30b could detect the failure of first controller 30a via the above-described technique of a heartbeat signal (i.e., register failure of first controller 30a upon no heartbeat of first controller 30a being received within time period H). Such contingency measure assures that control is still transitioned to second controller 30a, even if first controller 30a experiences a failure and is unable to transmit a suicide note. Similar comments apply if second controller 30b were to experience a failure before it is able to transmit a suicide note.

Figure 10:
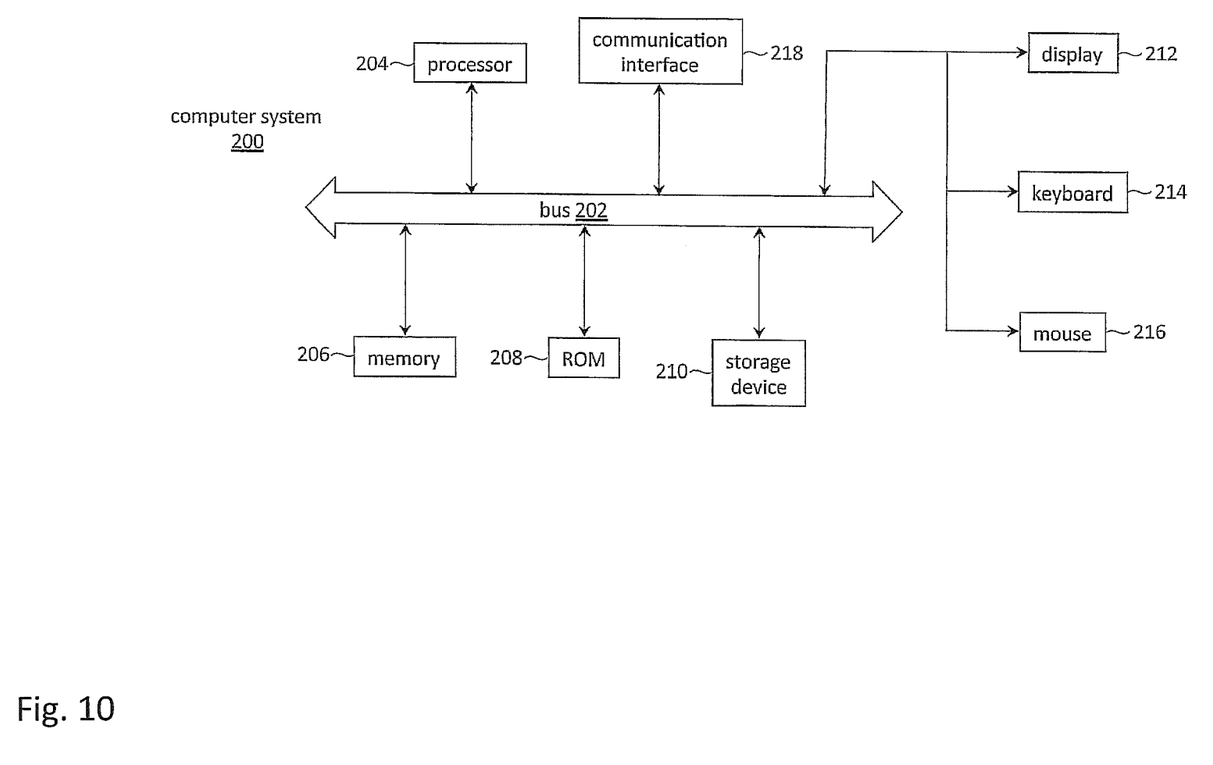
FIG. 10 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 10 provides an example of computer system 200 that is representative of any of the storage systems discussed herein. Further, computer system 200 is representative of a device that performs any of the processes depicted in FIGS. 5-9. Note, not all of the various computer systems may have all of the features of computer system 200. For example, certain of the computer systems discussed above may not include a display inasmuch as the display function may be provided by a client computer communicatively coupled to the computer system or a display function may be unnecessary. Such details are not critical to the present invention.

Computer system 200 includes a bus 202 or other communication mechanism for communicating information, and a processor 204 coupled with the bus 202 for processing information. Computer system 200 also includes a main memory 206, such as a random access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to the bus 202 for storing static information and instructions for the processor 204. A storage device 210, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 204 can read, is provided and coupled to the bus 202 for storing information and instructions (e.g., operating systems, applications programs and the like).

Computer system 200 may be coupled via the bus 202 to a display 212, such as a flat panel display, for displaying information to a computer user. An input device 214, such as a keyboard including alphanumeric and other keys, is coupled to the bus 202 for communicating information and command selections to the processor 204. Another type of user input device is cursor control device 216, such as a mouse, a trackball, or cursor direction keys for communicating direction information and command selections to processor 204 and for controlling cursor movement on the display 212. Other user interface devices, such as microphones, speakers, etc. are not shown in detail but may be involved with the receipt of user input and/or presentation of output.

The processes referred to herein may be implemented by processor 204 executing appropriate sequences of computer-readable instructions contained in main memory 206. Such instructions may be read into main memory 206 from another computer-readable medium, such as storage device 210, and execution of the sequences of instructions contained in the main memory 206 causes the processor 204 to perform the associated actions. In alternative embodiments, hard-wired circuitry or firmware-controlled processing units (e.g., field programmable gate arrays) may be used in place of or in combination with processor 204 and its associated computer software instructions to implement the invention. The computer-readable instructions may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 200 or similar electronic computing device, that manipulates and transforms data represented as physical (electronic) quantities within its registers and memories into other data similarly represented as physical quantities within its memories or registers or other such information storage, transmission or display devices.

Computer system 200 also includes a communication interface 218 coupled to the bus 202. Communication interface 218 provides a two-way data communication channel with a computer network, which provides connectivity to and among the various computer systems discussed above. For example, communication interface 218 may be a local area network (LAN) card to provide a data communication connection to a compatible LAN, which itself is communicatively coupled to the Internet through one or more Internet service provider networks. The precise details of such communication paths are not critical to the present invention. What is important is that computer system 200 can send and receive messages and data through the communication interface 218 and in that way communicate with hosts accessible via the Internet.

Thus, methods for transitioning control between two controllers of a storage system have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for a storage system, the storage system including a first controller, a second controller and a plurality of storage devices, each of the first and second controllers communicatively coupled to each one of the storage devices, the method comprising:

by the first controller,
(i) starting a first timer that expires after a first time period;
(ii) subsequent to starting the first timer, transmitting a first message from the first controller to a memory element shared by the first and second controllers; and
(iii) subsequent to transmitting the first message to the shared memory element and before the first timer expires, entering a failure state in which the first controller has failed and is unavailable to facilitate access to the storage devices,
wherein the transmission of the first message is in anticipation of the imminent failure of the first controller and is not reactive to a detection of the failure of the first controller; and by the second controller,
(i) receiving by the second controller the first message from the shared memory element, the first message notifying the second controller of the imminent failure of the first controller;
(ii) subsequent to receiving the first message, starting a second timer that expires after a second time period; and
(iii) upon the second timer expiring, entering an active state in which the second controller is active and is available to facilitate access to the storage devices.

2. The method of claim 1, wherein a duration of the first time period is adjustable by the first controller.

3. The method of claim 1, wherein the first message further notifies the second controller of a duration of the first time period.

4. The method of claim 1, wherein a duration of the second time period is equal to or greater than a duration of the first time period.

5. The method of claim 1, wherein after the second time period has elapsed following the reception of the first message, further transmitting, by the second controller, a second message to the shared memory element, the second message indicating that the second controller will start facilitating access to the storage devices.

6. The method of claim 1, wherein the second controller enters the active state without confirming whether the first controller has failed.

7. The method of claim 6, wherein the second controller does not confirm whether the first controller has failed based on a heartbeat signal of the first controller.

8. A storage system including a first controller, a second controller and a plurality of storage devices, each of the first and second controllers communicatively coupled to each one of the storage devices,
the first controller configured to:
(i) start a first timer that expires after a first time period;
(ii) subsequent to starting the first timer, transmit a first message from the first controller to a memory element shared by the first and second controllers; and
(iii) subsequent to transmitting the first message to the shared memory element and before the first timer expires, enter a failure state in which the first controller has failed and is unavailable to facilitate access to the storage devices,
wherein the transmission of the first message is in anticipation of the imminent failure of the first controller and is not reactive to a detection of the failure of the first controller; and
the second controller configured to:
(i) receive the first message from the shared memory element, the first message notifying the second controller of the imminent failure of the first controller;
(ii) subsequent to receiving the first message, start a second timer that expires after a second time period; and
(iii) upon the second timer expiring, enter an active state in which the second controller is active and is available to facilitate access to the storage devices.

9. The storage system of claim 8, wherein a duration of the second time period is equal to or greater than a duration of the first time period.

10. The storage system of claim 8, wherein the second controller enters the active state without confirming whether the first controller has failed.

11. The storage system of claim 10, wherein the second controller does not confirm whether the first controller has failed based on a heartbeat signal of the first controller.

12. The storage system of claim 8, wherein a duration of the first time period is adjustable by the first controller.

13. The storage system of claim 8, wherein the first message further notifies the second controller of a duration of the first time period.

14. The storage system of claim 8, wherein the second controller is further configured to, after the second time period has elapsed following the reception of the first message, transmit a second message to the shared memory element, the second message indicating that the second controller will start facilitating access to the storage devices.

15. A non-transitory machine-readable storage medium for a storage system having a first controller, a second controller and a plurality of storage devices, each of the first and second controllers communicatively coupled to each one of the storage devices, the non-transitory machine-readable storage medium comprising:
software instructions that, when executed by the first controller, cause the first controller to:
start a first timer that expires after a first time period;
subsequent to starting the first timer, transmit a first message from the first controller to a memory element shared by the first and second controllers; and
subsequent to transmitting the first message to the shared memory element and before the first timer expires, enter a failure state in which the first controller has failed and is unavailable to facilitate access to the storage devices,
wherein the transmission of the first message is in anticipation of the imminent failure of the first controller and is not reactive to a detection of the failure of the first controller; and
software instructions that, when executed by the second controller, cause the second controller to:
(i) receive the first message from the shared memory element, the first message notifying the second controller of the imminent failure of the first controller;
(ii) subsequent to receiving the first message, start a second timer that expires after a second time period; and
(iii) upon the second timer expiring, enter an active state in which the second controller is active and is available to facilitate access to the storage devices.

16. The non-transitory machine-readable storage medium of claim 15, wherein a duration of the first time period is adjustable by the first controller.

17. The non-transitory machine-readable storage medium of claim 15, wherein the second controller enters the active state without confirming whether the first controller has failed.

18. The non-transitory machine-readable storage medium of claim 15, wherein a duration of the second time period is equal to or greater than a duration of the first time period.

19. The non-transitory machine-readable storage medium of claim 15, wherein the first message further notifies the second controller of a duration of the first time period.

20. The non-transitory machine-readable storage medium of claim 15, further comprising software instructions that, when executed by the second controller, cause the second controller to, after the second time period has elapsed following the reception of the first message, transmit a second message to the shared memory element, the second message indicating that the second controller will start facilitating access to the storage devices.

* * * * *